(12) United States Patent
Wu et al.

(10) Patent No.: US 10,843,699 B2
(45) Date of Patent: Nov. 24, 2020

(54) VEHICLE CONTROL DEVICE

(71) Applicant: TuSimple, Inc., San Diego, CA (US)

(72) Inventors: Nan Wu, Beijing (CN); Qiyuan Liu, Beijing (CN); Weijun Liu, Beijing (CN)

(73) Assignee: TUSIMPLE, INC., San Diego, CA (US)

(*) Notice: Subject to any disclaimer, the term of this patent is extended or adjusted under 35 U.S.C. 154(b) by 91 days.

(21) Appl. No.: 15/908,763

(22) Filed: Feb. 28, 2018

(65) Prior Publication Data

US 2018/0251133 A1 Sep. 6, 2018

(30) Foreign Application Priority Data

Mar. 1, 2017 (CN) .......................... 2017 1 0115481

(51) Int. Cl.
*B60W 50/00* (2006.01)
*H04L 12/40* (2006.01)
(Continued)

(52) U.S. Cl.
CPC ............ *B60W 50/00* (2013.01); *B60W 10/06* (2013.01); *B60W 10/18* (2013.01); *B60W 10/20* (2013.01);
(Continued)

(58) Field of Classification Search
CPC ... B60R 16/023; B60R 16/03; B60R 16/0315; B60R 25/00; B60R 25/1004; B60R 25/2081; B60R 11/04; B60R 25/01; B60R 25/102; B60R 25/20; B60R 25/25; B60R 25/257; B60R 16/0231; B60R 19/48; B60R 25/241; B60R 25/302; B60W 50/00; B60W 10/06; B60W 10/18; B60W 10/20; B60W 10/30; B60W 50/0098; B60W 2050/0006; B60W 2050/0043; B60W 2540/10; B60W 2540/12; B60W 2540/18; G05D 1/008; H04L 12/40032; H04L 12/40169; H04L 2012/40215; H04L 2012/40273
See application file for complete search history.

(56) References Cited

U.S. PATENT DOCUMENTS

| | | | |
|---|---|---|---|
| 2013/0219039 A1* | 8/2013 | Ricci ................... | H04L 43/0876 709/223 |
| 2014/0332357 A1* | 11/2014 | Kirbawy .............. | H01H 13/063 200/16 B |

(Continued)

FOREIGN PATENT DOCUMENTS

DE     102018200172 A1 *  7/2018  ............. G08G 1/166

OTHER PUBLICATIONS

Espacenet Machine translations of DE102018200172 (Year: 2020).*

*Primary Examiner* — Tuan C To
*Assistant Examiner* — Paul A Castro
(74) *Attorney, Agent, or Firm* — Paul Liu; Perkins Coie, LLP

(57) ABSTRACT

An apparatus for controlling a vehicle, comprising: an upper level controller connected to a vehicle CAN (Controller Area Network) bus communication network by using a CAN bus communication mode, configured: to control a first control element connected to a vehicle CAN bus via the CAN bus communication network; and to control a second control element connected to a non-vehicle CAN bus via a hardwired connection.

18 Claims, 7 Drawing Sheets

(51) Int. Cl.
*G05D 1/00* (2006.01)
*B60W 10/30* (2006.01)
*B60W 10/06* (2006.01)
*B60W 10/20* (2006.01)
*B60W 10/18* (2012.01)

(52) U.S. Cl.
CPC ........ *B60W 10/30* (2013.01); *B60W 50/0098* (2013.01); *G05D 1/0088* (2013.01); *H04L 12/40032* (2013.01); *H04L 12/40169* (2013.01); *B60W 2050/0006* (2013.01); *B60W 2050/0043* (2013.01); *B60W 2540/10* (2013.01); *B60W 2540/12* (2013.01); *B60W 2540/18* (2013.01); *H04L 2012/40215* (2013.01); *H04L 2012/40273* (2013.01)

(56) References Cited

U.S. PATENT DOCUMENTS

2016/0053737 A1\* 2/2016 Solberg ............... F02N 11/0866
  701/113
2016/0167653 A1\* 6/2016 Malone ................ B60W 10/18
  701/23

\* cited by examiner

VEHICLE CONTROL DEVICE

PRIORITY FOREIGN PATENT APPLICATION

This is a U.S. non-provisional utility patent application drawing priority from Chinese patent application serial no. 201710115481.4; filed Mar. 1, 2017. This present non-provisional patent application draws priority from the referenced foreign patent application. The entire disclosure of the referenced patent application is considered part of the disclosure of the present application and is hereby incorporated by reference herein in its entirety.

TECHNICAL FIELD

The present disclosure relates to a technology of vehicle engineering, and more particularly, to an apparatus for controlling a vehicle.

BACKGROUND

Recently, with the development of intelligent transportation, more and more traditional automobile manufacturers and high-tech companies are starting to study autonomous vehicles for realizing vehicle autonomous driving. Controlling throttle, brake, wheel, shift, and headlights are the major field with respect to autonomous driving technology.

To achieve autonomous driving control, most practices are to do substantial changes in the hardware and software of the vehicle. For example, adding external auxiliary systems to the entire vehicle system to control the wheel, throttle, brake, and other components of the vehicle; adding external auxiliary systems to parts of the vehicle system to control the wheel, throttle, brake, and other components of the vehicle, and the rest of the vehicle system is controlled by a CAN (Controller Area Network) bus; and the entire vehicle system is controlled by a CAN bus with revising the logic of internal program of ECU (Electronic Control Unit) or VCU (Vehicle Control Unit).

The structures of the hardware and software of a vehicle are complicated. Any error regarding modification of the vehicle system can cause a safety issue. Moreover, the error may cause a malfunction of the vehicle system.

SUMMARY

The present invention discloses an apparatus for controlling a vehicle. The apparatus includes an upper level controller configured to connect to the vehicle CAN (Controller Area Network) bus communication network by using CAN bus communication, wherein the upper level controller controls: a first control element connected to the vehicle CAN bus communication network; and a second control element connected to non-vehicle CAN bus.

DETAILED DESCRIPTION

A detailed description of the invention body of work is provided below. Before explaining at least one embodiment of the invention in detail, it is to be understood that the invention is not limited to the following embodiments and is applicable to other embodiments or of being practiced or carried out in various ways. Also, it is to be understood that the phraseology and terminology employed herein is for description and should not be regarded as a limitation.

Figure 1:
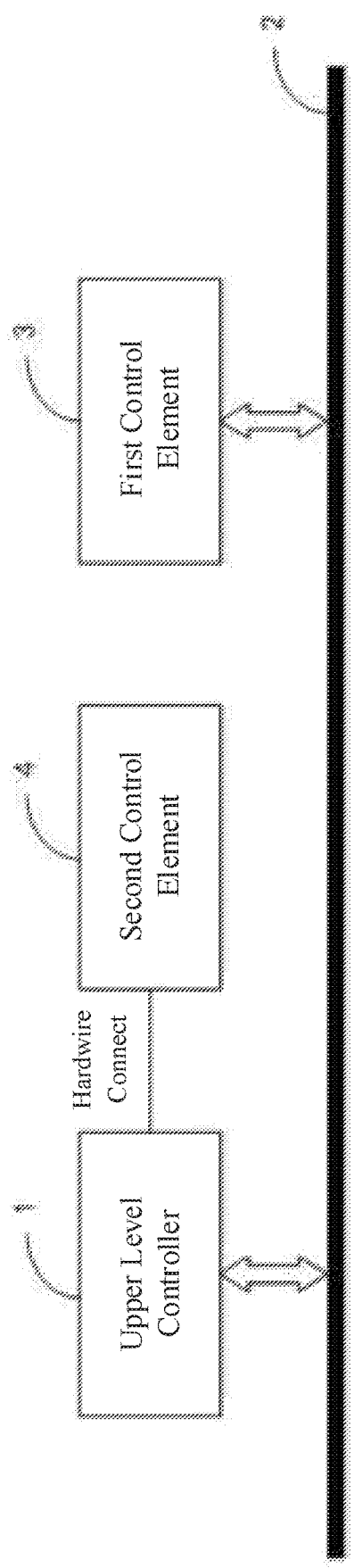
FIG. 1 is a first schematic of a vehicle control apparatus.

FIG. 1 is a schematic figure of a vehicle control apparatus provided by embodiments of the present invention, including: upper level controller 1 connected to a vehicle CAN bus communication network by using a CAN bus communication mode, configured to control a first control element 3 connected to a vehicle CAN bus 2 via the CAN bus communication network, and to control a second control element 4 connected to a non-vehicle CAN bus via a hardwired connection.

Figure 2:
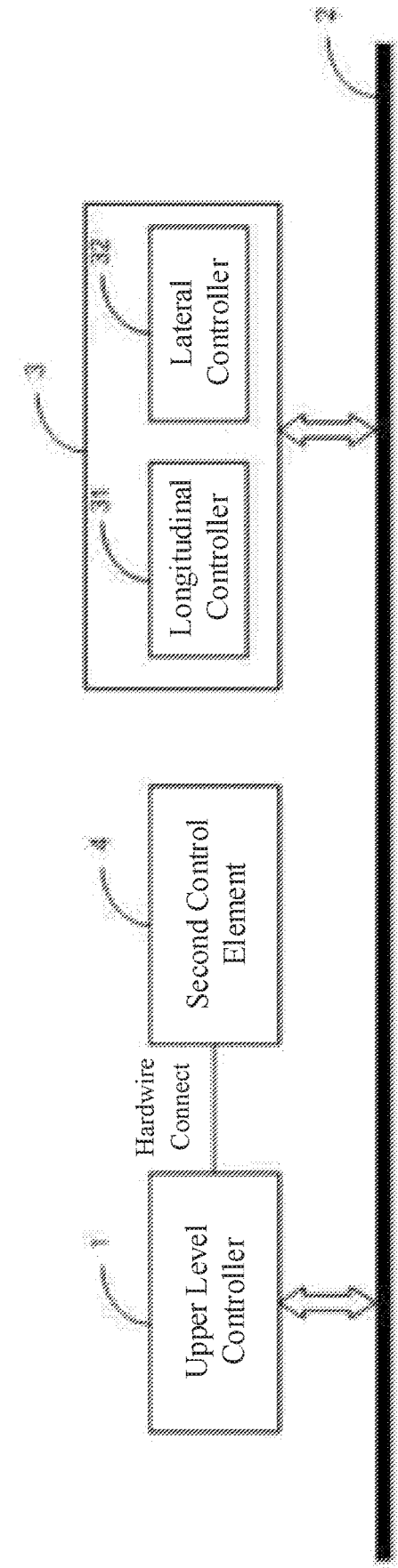
FIG. 2 is a second schematic of a vehicle control apparatus.

In one embodiment, the first control element 3 in FIG. 1 refers to an existing controller in the vehicle, which supports CAN bus communication. In one example, the first control element 3 may include one or more of following: a longitudinal controller, a lateral controller, and an engine control unit. In FIG. 2, the first control element 3 includes a longitudinal controller 31, a lateral controller 32, and an engine control unit 33.

Figure 3:
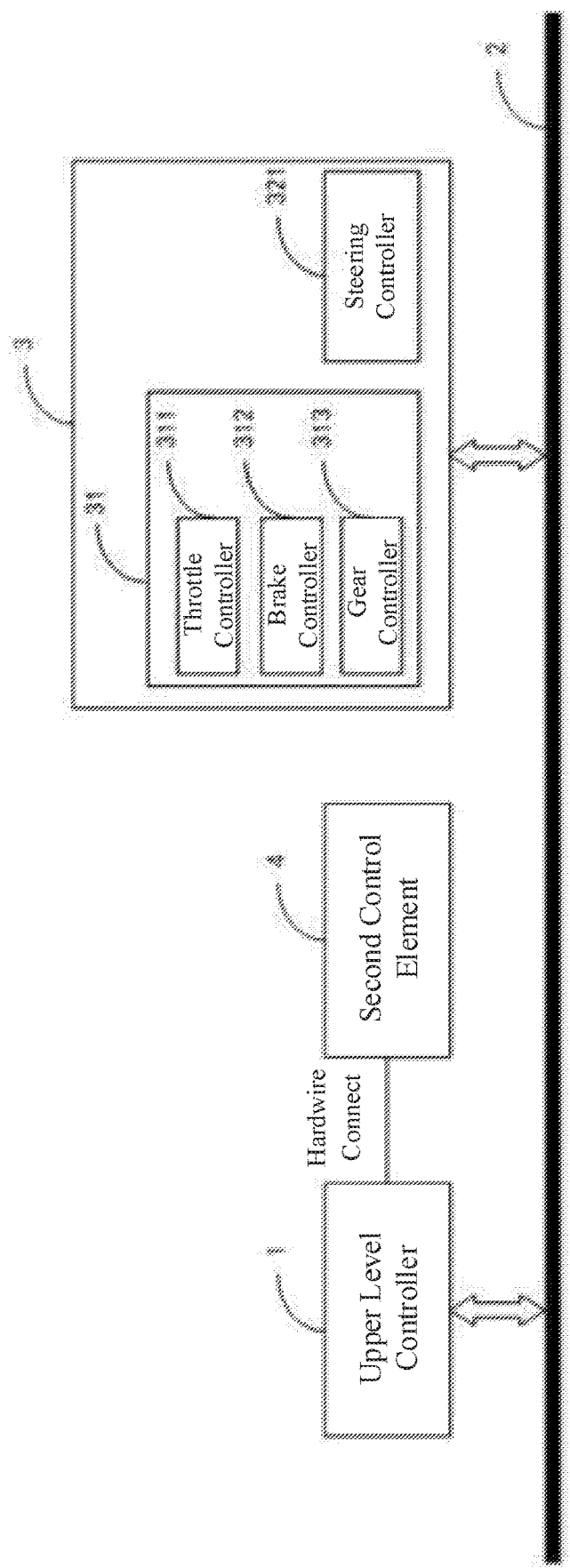
FIG. 3 is a third schematic of a vehicle control apparatus.

In another embodiment, in FIG. 1 and FIG. 2, the longitudinal controller 31 may comprise one or more of a throttle controller, a brake controller and a gear controller. As FIG. 3 illustrates the components of FIG. 2, the longitudinal controller 31 comprise a throttle controller 311, a brake controller 312, and a gear controller 313. The lateral controller 32 may comprises but not limits to a steering controller 321.

In one embodiment, in the FIG. 1, FIG. 2, and FIG. 3, the second control element 4 refers to an existing controller mounted in the vehicle which does not supports CAN bus communication mode. The second control element 4 may comprise at least one controller actuator and/or at least one vehicle mounted sensor; as FIG. 4 illustrates, the second control element 4 in FIG. 3 comprises a controller actuator 41 and a vehicle mounted sensor 42.

In another embodiment, the at least one controller actuator 41 comprises one or more of a front headlight, a turn signal, a windshield wiper, a speaker, a vehicle window, a door locker, a vehicle multimedia system, and a seat, etc. As FIG. 5 illustrates, the at least one controller actuator 41 in FIG. 4 comprises a front headlight 411, a turn signal 412, and a windshield wiper 413.

Figure 4:
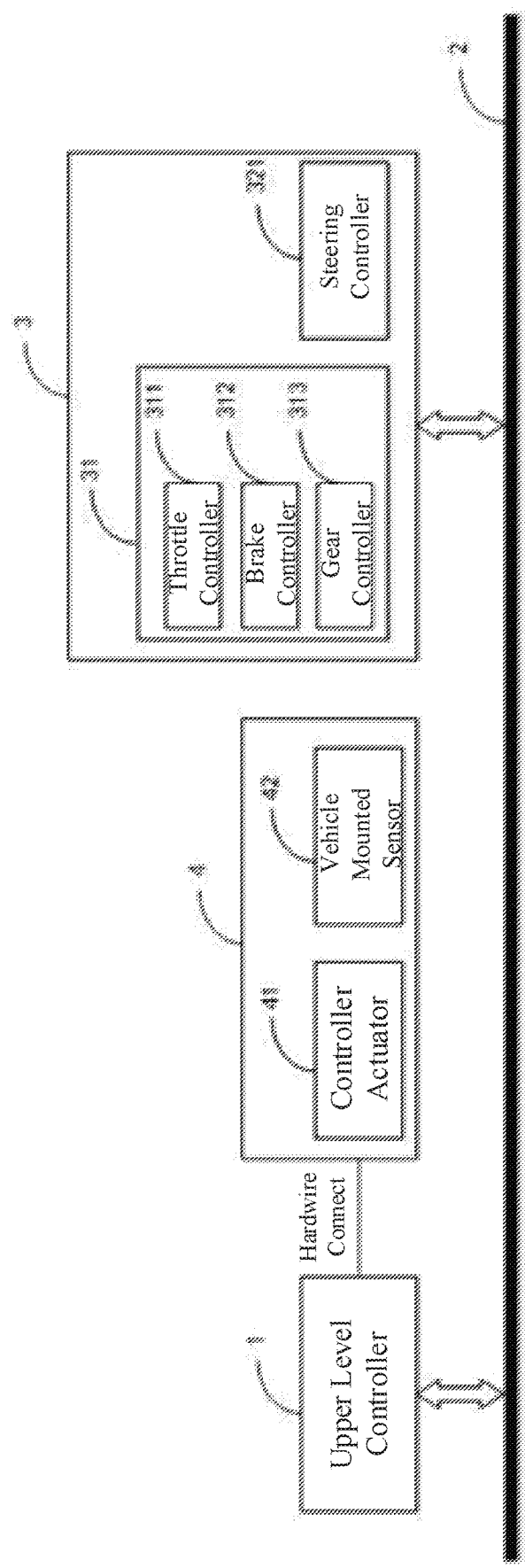
FIG. 4 is a fourth schematic of a vehicle control apparatus.
Figure 5:
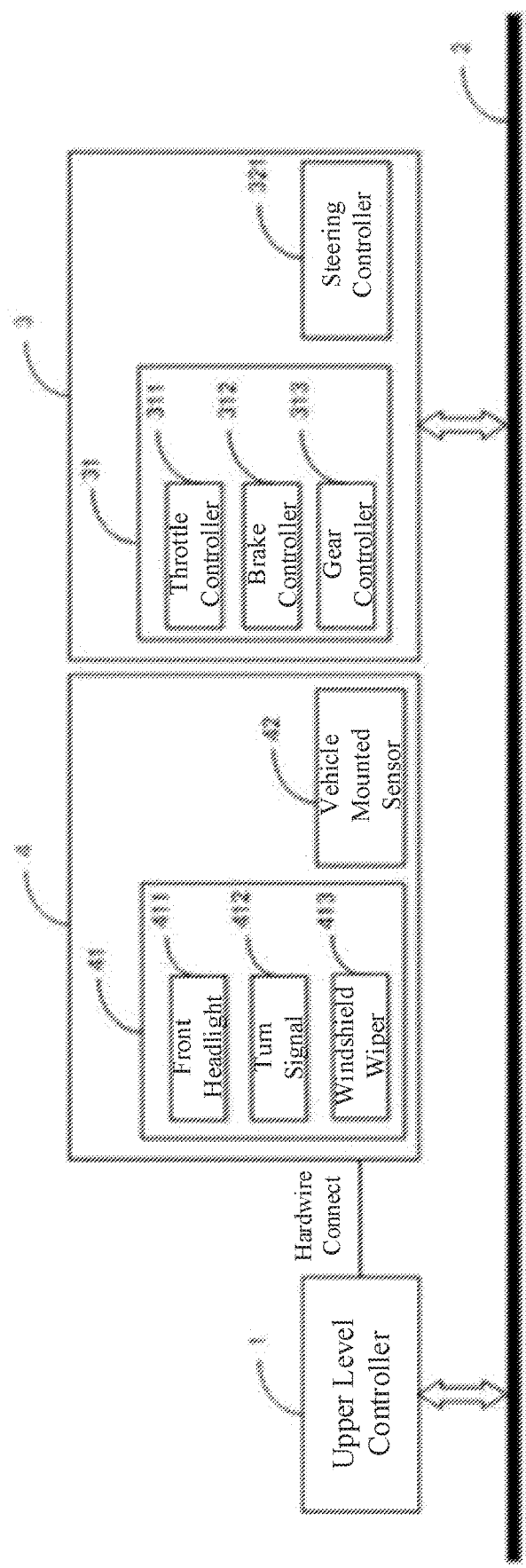
FIG. 5 is a fifth schematic of a vehicle control apparatus.
Figure 6:
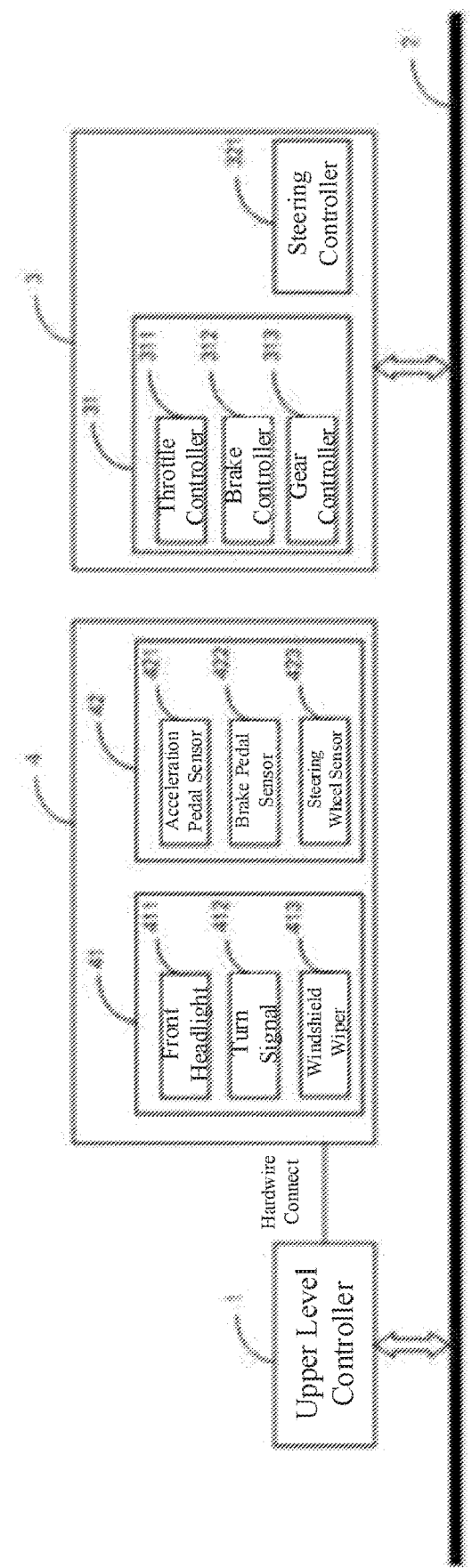
FIG. 6 is a sixth schematic of a vehicle control apparatus.

In another embodiment, in the FIG. 4 or FIG. 5, the at least one vehicle mounted sensor 42 may comprise one of more of an acceleration pedal sensor, a brake pedal sensor, and a steering wheel sensor. As FIG. 6 illustrates, the at least one vehicle mounted sensor 42 in the FIG. 5 comprises an acceleration pedal sensor 421, a brake pedal sensor 422, and a steering wheel sensor 423.

In one embodiment, for decreasing the modification of a vehicle, a condition of the vehicle applying the present invention could be switched to an original condition of the vehicle, by implementing a hardware switch to connect or depart the upper level controller and the vehicle.

Figure 7:
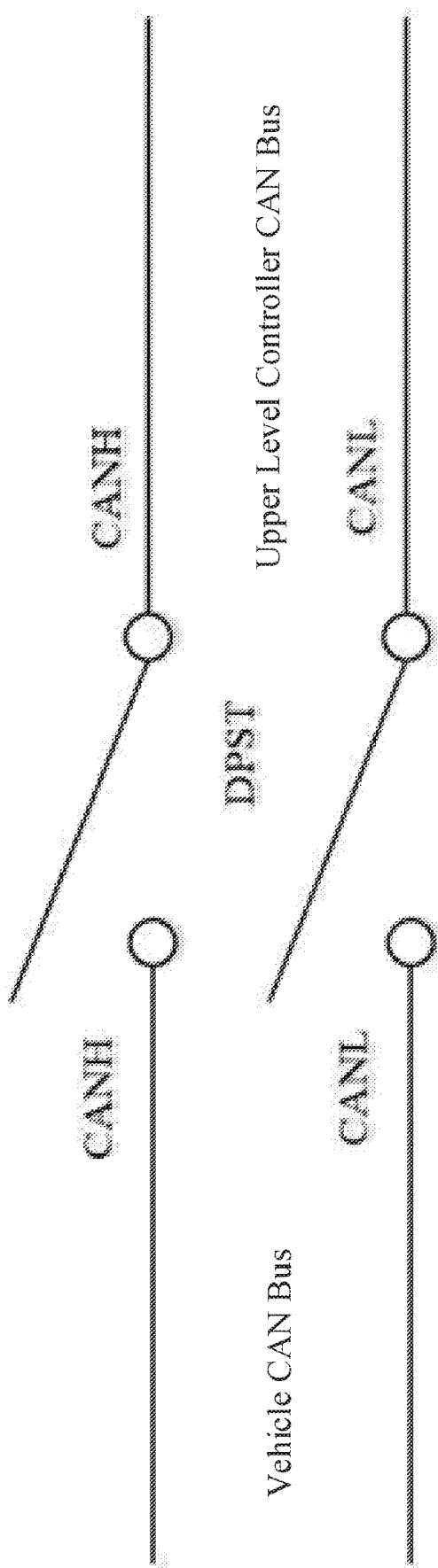
FIG. 7 is a schematic illustrating how the upper controller connects to the CAN bus of the vehicle.

In one embodiment, as FIG. 7 illustrates, upper level controller 1 may connect to the CAN bus of the vehicle by implementing a DPST (double pole single throw) switch.

Figure 8:
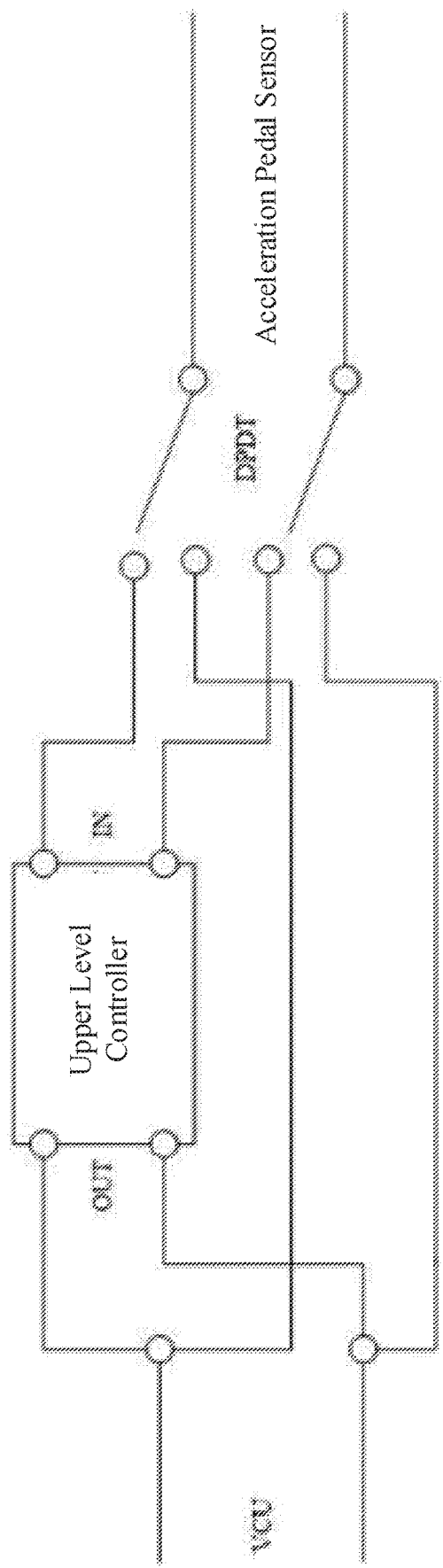
FIG. 8 is a schematic illustrating a connection between the upper level controller and an acceleration pedal sensor.

In another embodiment, upper level controller 1 may connect to each second control element 4 by a DPDT (double pole double throw) switch. For instance, upper level controller 1 connects to an acceleration pedal sensor by using a DPDT switch; upper level controller 1 connects to a windshield wiper by using a five-pole double throw switch, etc. As illustrated in FIG. 8, upper level controller connects to the acceleration pedal sensor by using a DPDT switch.

In one embodiment, the upper level controller 1 includes a decision-making control function by which the upper level controller 1 could generate control commands controlling the first and the second control elements based on vehicle information, for example, acceleration pedal position, brake pedal position, vehicle speed, engine speed, gear, steering wheel angle/torque signal, controller actuator malfunction diagnosis information, tire pressure, tank fuel, battery voltage, etc. Therefore in the embodiments of the invention, upper level controller may be further configured to collect vehicle information from the first control element 3 and the second control element 4, and generate one or more control commands based on the collected vehicle information for controlling the first control element 3 and the second control element 4.

In another embodiment, for further improving speed and accuracy of decision making, the upper level controller of the embodiment of the invention is embodied without decision-making control function, and the decision-making control function is realized by a preset upper calculating server. Wherein the vehicle information is collected by the upper level controller from controllers of the vehicle and sent to the upper calculating server, one or more instructions generated by the upper calculating server are converted by the upper controller to one or more control instructions identifiable by each controller, for example, according to the correspondence relationship between storing each computer instruction and each control instruction, and then controlling each controller of the vehicle can be achieved. Therefore, in the embodiment of the invention, the upper level controller is further configured to collect vehicle information from the first control element and the second control element for an autonomous vehicle, to send the vehicle information to the upper calculating server, to receive one or more instructions from the upper calculating server for controlling the first control element and the second control element, and to convert the one or more instructions to identified one or more control instructions for identifiable by the first control element and the second control element.

In embodiments of the invention, the upper level controller 1 could be a digital signal processor (DSP), a field programmable gate array (FPGA), an industrial computer, an electronic control unit (ECU), or a vehicle control unit (VCU).

In the technical scheme of the present invention, by applying an upper level controller in a vehicle, on the one hand, the controlling for the first control element can be achieved, where the upper level controller controls the first control element via a CAN bus communication network, without damaging the original hardware and software structures of the vehicle, on the other hand, the upper controller controls the second control element, which does not support CAN bus communication mode, via a hardwired connection, where the hardwired connection can be realized with minor structure changes and without damaging hardware structure of the vehicle. Therefore, by implementing the technical scheme of the invention, the autonomous driving controlling can be achieved without damaging hardware structure of a vehicle and without increase safety hazard of the vehicle, and with the advantages of simple operation, easy realization and strong university.

What is claimed is:

1. An apparatus for controlling a vehicle, the apparatus comprising:
   an upper level controller connected to a hardwired connection in the vehicle and further connected to a vehicle controller area network (CAN) bus communication network by using a CAN bus communication mode, the upper level controller being further in communication with an upper calculating server, the upper level controller configured to:
   collect vehicle information from a first control element and a second control element;
   generate one or more control commands or one or more control instructions;
   control, based on the one or more control commands or the one or more control instructions, a first control element including a controller in the vehicle connected to the upper level controller via a vehicle CAN bus providing the CAN bus communication network; and
   control, based on the one or more control commands or the one or more control instructions, a second control element including at least one controller actuator or at least one vehicle-mounted sensor connected to the upper level controller via the hardwired connection, the second control element being independently connected to the upper level controller separately from the CAN bus communication network,
   wherein the upper level controller generates the one or more control commands by using a decision-making control function of the upper level controller based on the vehicle information, and
   wherein the upper level controller generates the one or more control instructions by:
   sending the vehicle information to the upper calculation server;
   receiving one or more server-generated instructions generated by the upper calculating server using a decision-making control function of the upper calculating server; and
   converting the one or more server-generated instructions to the one or more control instructions identifiable by the controller in the vehicle.

2. The apparatus according to claim 1, wherein the first control element comprises one or more of the following: a longitudinal controller, a lateral controller, and an engine control unit.

3. The apparatus according to claim 2, wherein the longitudinal controller comprises one or more of the following: a throttle controller, a brake controller, and a gear controller.

4. The apparatus according to claim 2, wherein the lateral controller comprises a steering controller.

5. The apparatus according to claim 1, wherein the at least one controller actuator comprises one or more of the following: a front headlight, a turn signal, a windshield wiper, a speaker, a vehicle window, a door locker, a vehicle multimedia system, and a seat.

6. The apparatus according to claim 1, wherein the at least one vehicle-mounted sensor comprises one or more of the following: an accelerator pedal sensor, a brake pedal sensor, and a steering wheel sensor.

7. The apparatus according to claim 1, wherein the upper level controller connects to the second control element by using a multi-pole-double-throw switch.

8. The apparatus according to claim 1, wherein the upper level controller connects to the CAN bus by using a double-pole-single-throw switch.

9. The apparatus according to claim 1, wherein the upper level controller comprises a digital signal processor (DSP), a field programmable gate array (FPGA), an industrial computer, an electronic control unit (ECU), or a vehicle control unit (VCU).

10. The apparatus according to claim 1, wherein the independent connection of the second control element to the upper level controller does not use the CAN bus communication mode.

11. A method for controlling a vehicle, the method comprising
providing an upper level controller connected to a hardwired connection in the vehicle and further connected to a vehicle controller area network (CAN) bus communication network by using a CAN bus communication mode, the upper level controller being further in communication with an upper calculating server;
using the upper level controller to collect vehicle information from a first control element and a second control element;
using the upper level controller to generate one or more control commands or one or more control instructions;
using the upper level controller to control, based on the one or more control commands or the one or more control instructions, a first control element including a controller in the vehicle connected to the upper level controller via a vehicle CAN bus providing the CAN bus communication network; and
using the upper level controller to control, based on the one or more control commands or the one or more control instructions, a second control element including at least one controller actuator or at least one vehicle-mounted sensor connected to the upper level controller via the hardwired connection, the second control element being independently connected to the upper level controller separately from the CAN bus communication network,
wherein the upper level controller generates the one or more control commands by using a decision-making control function of the upper level controller based on the vehicle information, and
wherein the upper level controller generates the one or more control instructions by:
sending the vehicle information to the upper calculation server;
receiving one or more server-generated instructions generated by the upper calculating server using a decision-making control function of the upper calculating server; and
converting the one or more server-generated instructions to the one or more control instructions identifiable by the controller in the vehicle.

12. The method according to claim 11, wherein the first control element further comprises one or more of the following: a throttle controller, a brake controller, a gear controller, and a steering controller.

13. The method according to claim 11, wherein the at least one controller actuator comprises one or more of the following: a front headlight, a turn signal, a windshield wiper, a speaker, a vehicle window, a door locker, a vehicle multimedia system, and a seat.

14. The method according to claim 11, wherein the at least one vehicle-mounted sensor comprises one or more of the following: an accelerator pedal sensor, a brake pedal sensor, and a steering wheel sensor.

15. In an apparatus having an upper level controller connected to a hardwired connection in the vehicle and further connected to a vehicle controller area network (CAN) bus communication network by using a CAN bus communication mode, the upper level controller being further in communication with an upper calculating server, a non-transitory machine-useable storage medium embodying instructions which, when executed by a data processor, cause the apparatus to:
use the upper level controller to collect vehicle information from a first control element and a second control element;
use the upper level controller to generate one or more control commands or one or more control instructions;
use the upper level controller to control, based on the one or more control commands or the one or more control instructions, a first control element including a controller in the vehicle connected to the upper level controller via a vehicle CAN us providing the CAN bus communication network;
use the upper level controller to control, based on the one or more control commands or the one or more control instructions, a second control element including at least one controller actuator or at least one vehicle-mounted sensor connected to the upper level controller via a hardwired connection, the second control element being independently connected to the upper level controller separately from the CAN bus communication network,
wherein the upper level controller generates the one or more control commands by using a decision-making control function of the upper level controller based on the vehicle information, and
wherein the upper level controller generates the one or more control instructions by:
sending the vehicle information to the upper calculation server;
receiving one or more server-generated instructions generated by the upper calculating server using a decision-making control function of the upper calculating server; and
converting the one or more server-generated instructions to the one or more control instructions identifiable by the controller in the vehicle.

16. The non-transitory machine-useable storage medium according to claim 15, wherein the first control element further comprises one or more of the following: a throttle controller, a brake controller, a gear controller, and a steering controller.

17. The non-transitory machine-useable storage medium according to claim 15, wherein the at least one controller actuator comprises one or more of the following: a front headlight, a turn signal, a windshield wiper, a speaker, a vehicle window, a door locker, a vehicle multimedia system, and a seat.

18. The non-transitory machine-useable storage medium according to claim 15, wherein the at least one vehicle-mounted sensor comprises one or more of the following: an accelerator pedal sensor, a brake pedal sensor, and a steering wheel sensor.

* * * * *

UNITED STATES PATENT AND TRADEMARK OFFICE
CERTIFICATE OF CORRECTION

PATENT NO. : 10,843,699 B2
APPLICATION NO. : 15/908763
DATED : November 24, 2020
INVENTOR(S) : Nan Wu et al.

Page 1 of 1

It is certified that error appears in the above-identified patent and that said Letters Patent is hereby corrected as shown below:

In the Specification

In Column 2, Lines 57-58, delete "one of more" and insert -- one or more --, therefor.

In the Claims

In Column 5, Lines 6-17, in Claim 11, delete "comprising" and insert -- comprising: --, therefor.

In Column 6, Line 24, in Claim 15, delete "CAN us" and insert -- CAN bus --, therefor.

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*